US012807335B2

(12) United States Patent
Journath

(10) Patent No.: US 12,807,335 B2
(45) Date of Patent: Nov. 24, 2026

(54) MULTICHANNEL ACTUATION SYSTEM FOR A LAUNCH VEHICLE

(71) Applicant: Beyond Gravity Sweden AB, Gothenburg (SE)

(72) Inventor: Niklas Journath, Motala (SE)

(73) Assignee: Beyond Gravity Sweden AB, Gothenburg (SE)

( * ) Notice: Subject to any disclaimer, the term of this patent is extended or adjusted under 35 U.S.C. 154(b) by 383 days.

(21) Appl. No.: 18/394,824

(22) Filed: Dec. 22, 2023

(65) Prior Publication Data

US 2025/0206471 A1 Jun. 26, 2025

(51) Int. Cl.
*B64G 1/64* (2006.01)

(52) U.S. Cl.
CPC .................................... *B64G 1/644* (2023.08)

(58) Field of Classification Search
CPC ................................ B64G 1/644; B64G 1/645
USPC .............................................................. 700/1
See application file for complete search history.

(56) References Cited

U.S. PATENT DOCUMENTS 5,271,582 A 12/1993 Perkins et al.
6,290,275 B1 * 9/2001 Braam ................. B25J 15/0019 901/30
9,250,051 B1 2/2016 Smith et al.
9,810,515 B1 11/2017 Current et al.
10,124,915 B2 * 11/2018 Novotney .............. B64G 1/641
2014/0069289 A1 3/2014 DeVries et al.
2019/0168395 A1 * 6/2019 Hay ..................... B25J 15/0408
2019/0225354 A1 * 7/2019 Novotney ............... F42C 15/42
2020/0198809 A1 * 6/2020 Holder ....................... B64F 1/10
2022/0340309 A1 * 10/2022 Thenander ............. B64G 1/643
2023/0140889 A1 * 5/2023 Thenander ............. B64G 1/641 244/173.3
2024/0124166 A1 * 4/2024 Baghdasarian ..... F15B 15/1447
2024/0412650 A1 * 12/2024 Wetzel ...................... G08G 5/55
2024/0425208 A1 * 12/2024 Mora Plaza ........... B64G 1/641

FOREIGN PATENT DOCUMENTS

WO 2020/205174 A1 10/2020

OTHER PUBLICATIONS

What Is Electrical Isolation?, Jun. 8, 2022, atlas-scientific.com, pp. 1-8.*
Ahmed Faizan, Resistance Measurement Methods, May 13, 2020, electricala2z.com, pp. 1-10.*
Extended European Search Report mailed May 20, 2025 for European Patent Application No. 24219494.2, 10 pages.

* cited by examiner

*Primary Examiner* — Andrew R Dyer
(74) *Attorney, Agent, or Firm* — Sage Patent Group

(57) ABSTRACT

A multichannel actuation system for a launch vehicle. The multichannel actuation system includes a control unit operably connected to a single interface unit, and a plurality of individual hold-and-release mechanisms (HRMs) configured for releasably holding a plurality of payloads to the launch vehicle. Each of the plurality of HRMs is operably connected to the interface unit. The interface unit is configured for controlling actuation of the plurality of HRMs based on release operation instructions received from the control unit.

19 Claims, 11 Drawing Sheets

MULTICHANNEL ACTUATION SYSTEM FOR A LAUNCH VEHICLE

TECHNICAL FIELD

The present disclosure relates to a multiple payload release actuation system for a launch vehicle, such as for example a rocket-powered vehicle designed to carry multiple payloads from Earth's surface to space. The payload is for example satellites.

The disclosure also relates to a launch vehicle carrying such a multiple payload release actuation system, a payload dispenser structure for carrying and releasing a plurality of payloads, and a method for operating such a multiple payload release actuation system for a payload dispenser structure of a launch vehicle.

Multiple payload release actuation system, and satellite dispenser systems in general, are mainly used for multiple satellite launches. A dispenser system includes a structure frame for carrying the payloads, herein referred to as a payload dispenser structure, a separation system for enabling selective release of payload from the payload dispenser structure, and an electrical harness for enabling remote control of the release separation system. The payload dispenser structure is typically attached at its lower interface to a launch vehicle's upper stage.

BACKGROUND

In the field of multiple payload release actuation system for a launch vehicle, there is continuous demand for improvements in terms of robustness, operational reliability, low-cost and low-weight.

For example, U.S. Pat. No. 9,810,515 discloses a networked electronic ordnance system having a first plurality of pyrotechnic release devices connected to a first network bus, which is connected to a first bus controller, a second plurality of pyrotechnic release devices connected to a second network bus, which is connected to a second bus controller, wherein a bus interface circuit is connected to the first and second bus controller.

However, the use of a network bus for operating the pyrotechnic release devices requires electronic circuits at the pyrotechnic release devices for communication with the bus controller, thereby increasing cost and complexity, and the large number of distributed electronic components with its operating software is susceptible to errors, thereby potentially resulting in reduced reliability.

There is thus a need for an improved multiple payload release actuation system in terms of high operating reliability, low cost and low weight.

SUMMARY

An object of the present disclosure is to provide a multichannel actuation system where the previously mentioned problems are avoided. This object is at least partly achieved by the features of the independent claims.

According to a first aspect of the present disclosure, there is provided a multichannel actuation system for a launch vehicle. The multichannel actuation system comprises: a control unit operably connected to a single interface unit; and a plurality of individual hold-and-release mechanisms (HRMs) configured for releasably holding a plurality of payloads to the launch vehicle; wherein each of the plurality of HRMs is operably connected to the interface unit; and wherein the interface unit is configured for controlling actuation of the plurality of HRMs based on release operation instructions received from the control unit.

In this way, the electronics is well contained in two units, thereby enabling improved control of undesirable EMI, capacitive and/or inductive couplings, current leakage, ground, noise, etc. Furthermore, the reduced amount of electronic devices results in reduced electronic component and software development cost, and use of more rugged and sturdy electrical conductors for controlling the release devices enables increased operational reliability.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The multichannel actuation system according to the disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

With reference to FIGS. 1-5B, the present disclosure relates to a multichannel actuation system for a payload dispenser structure 1 of a launch vehicle 2, such as for example a rocket-powered vehicle designed to carry multiple payloads 3 from Earth's surface to space.

Figure 1:
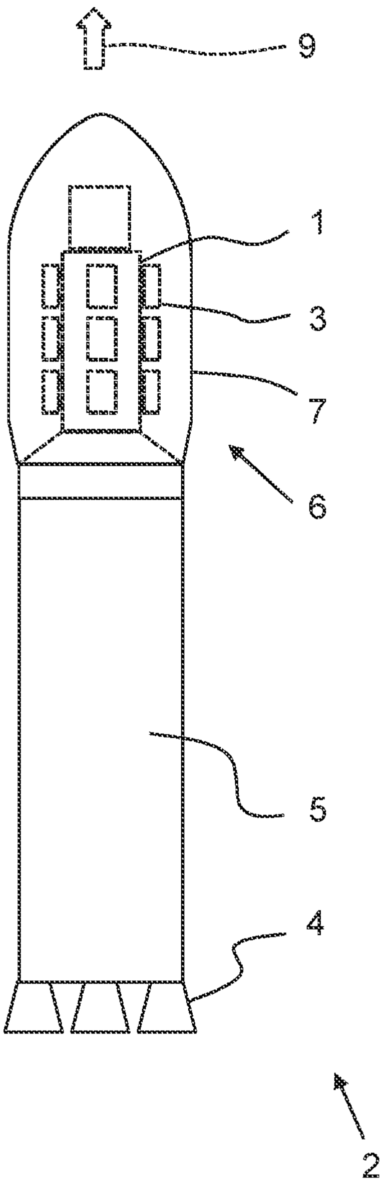
FIG. 1 shows schematically a side-view of an example embodiment of a launch vehicle.
Figure 2:
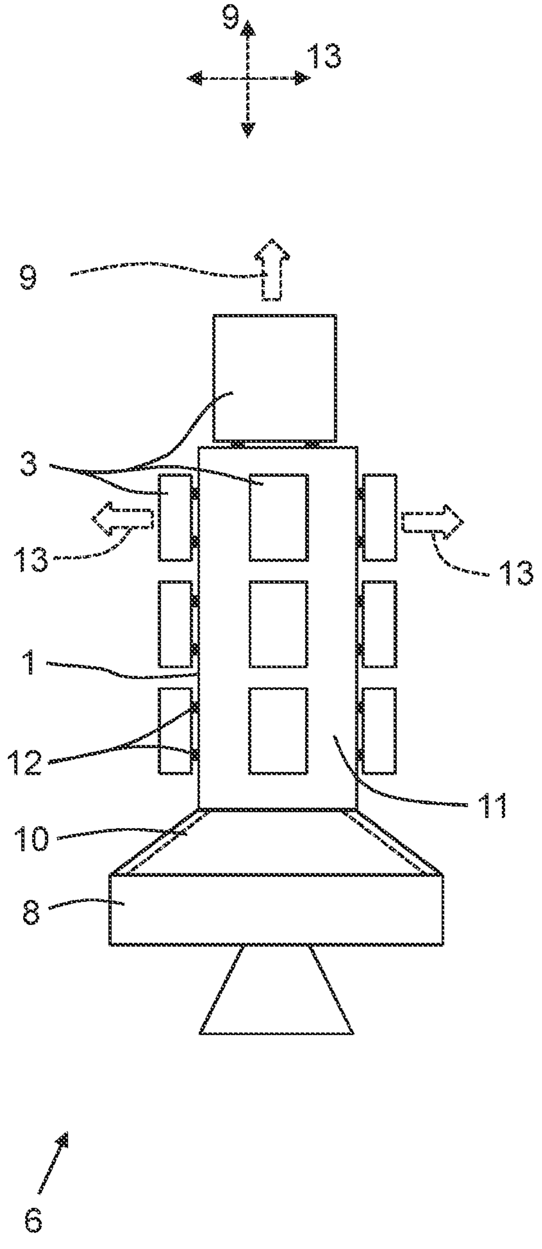
FIG. 2 shows schematically a side view of an example embodiment of the payload dispenser structure with payloads.
Figure 3:
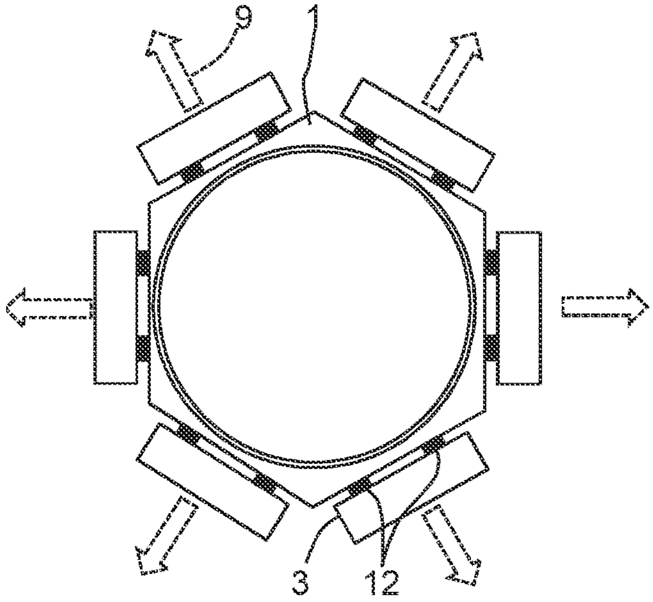
FIG. 3 shows schematically a top view of an example embodiment of the payload dispenser structure with payloads.
Figure 4:
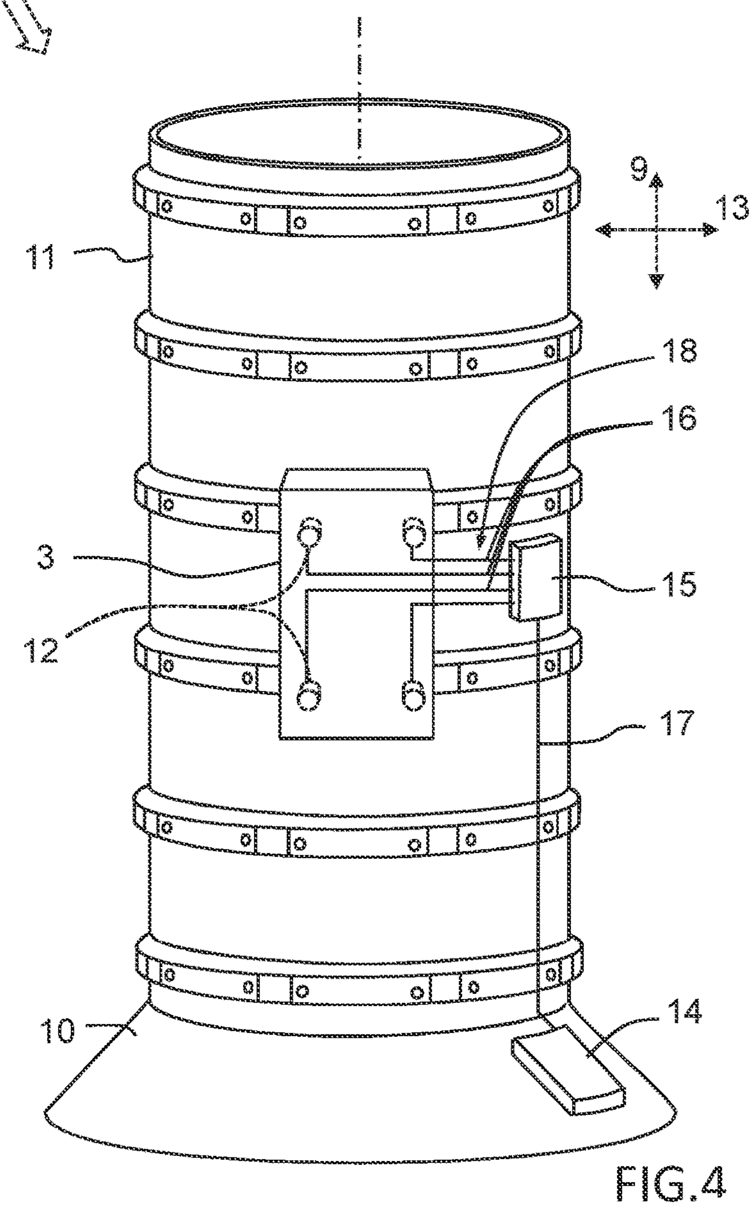
FIG. 4 shows schematically a perspective view of an example embodiment of the complete payload dispenser structure.
Figure 5A:
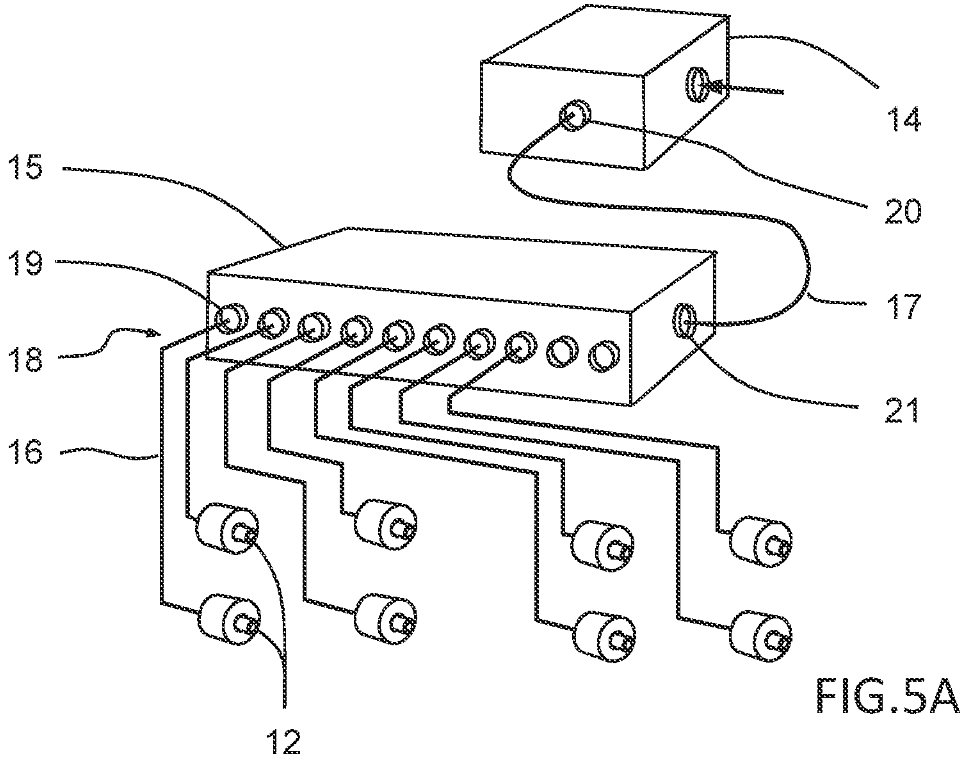
FIG. 5A-B show schematically two example embodiments of an electrical control structure of the HRMs according to the present disclosure.
Figure 5B:
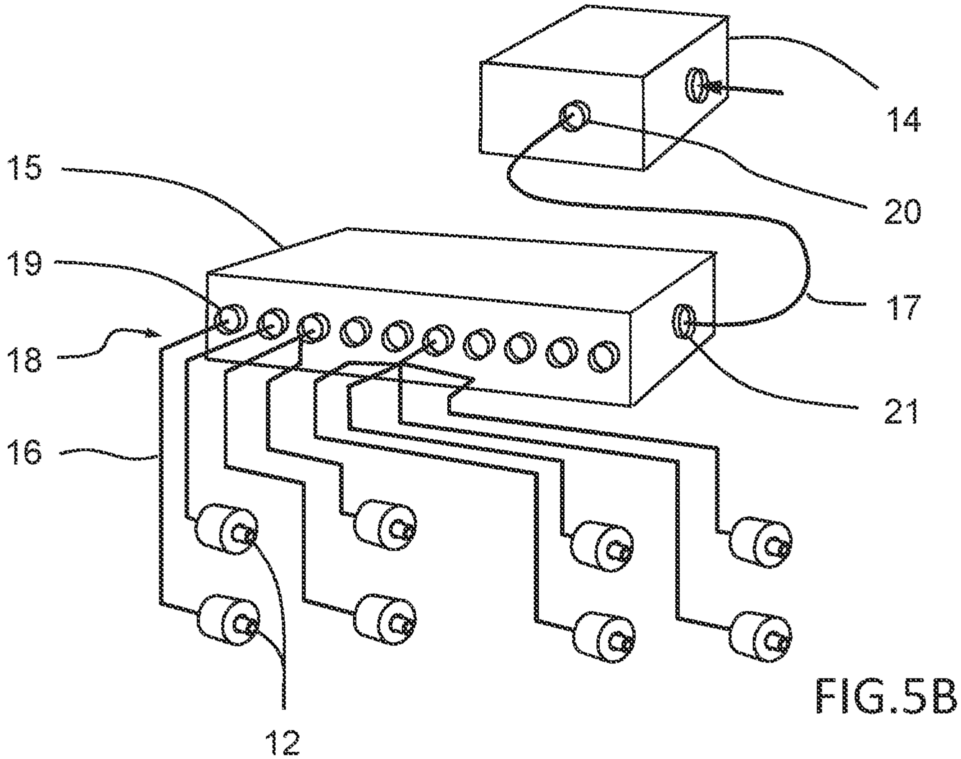

FIG. 1 shows a full side view of an example embodiment of a launch vehicle 2, FIG. 2 shows a side view of an example embodiment of the payload dispenser structure with payloads 3, FIG. 3 shows a top view of the payload dispenser structure 1 with payloads 3, FIG. 4 shows a perspective view of the complete payload dispenser structure 1 with only a single payload 3 installed via four individual hold-and-release mechanism (HRMs) 12, and FIGS. 5A-B schematically illustrates two example embodiments of the electrical control structure of the HRMs 12.

The launch vehicle 2 travels in an intended flight direction 10 and has a main engine 4 at the lower end, a fuel tank portion 5, and a top portion 6 including the payload dispenser structure 1 protected by a payload fairing 7.

When the launch vehicle 2 is out of fuel, the payload dispenser structure 1 with the multiple payloads 3 and a dedicated payload dispenser structure engine 8 separates from the launch vehicle 2 and continues to the planned payload release destination as schematically illustrated in FIG. 2.

The payload dispenser structure 1 has at its lower interface an integral or separate adapter portion 10 configured for rigidly connecting the payload dispenser structure 1 to the launch vehicle 2 or the launch vehicle's upper stage, i.e. a payload dispenser structure engine 8.

The payload carrying portion 11 may for example be a rigid frame structure or a rigid hollow cylinder structure, or the like, that provides support to the payloads 3 during the transport phase. The payload carrying portion 11 may alternatively be partly composed of the payloads themselves, as described later in connection with a stacked multiple payload structure.

The payloads 3 are releasably fastened to the payload dispenser structure 1 via a plurality of hold-and-release mechanisms (HRMs) 12. In the schematic example embodiment of the payload dispenser structure 1 of FIG. 2, the top side payload 3 may be released in the flight direction 9 and the side mounted payloads 3 may for example be released in a lateral direction 13, i.e. perpendicular to the flight direction 9.

With reference to FIGS. 1-5B, multichannel actuation system is used mainly for multiple satellite launches. The dispenser system includes a payload dispenser structure 1, a plurality of HRMs 12 for holding the payloads 3 to the payload carrying portion 11, and for enabling selective release of the payloads 3 from the payload carrying portion 11.

Release of the payloads 3, i.e., control of the HRMs 12, is performed by means of a control unit 14 that is operably connected to and in communication with a single interface unit 15 via an interface bus 17.

In other words, only one interface unit 15 is connected to the control unit 14.

The interface bus 17 is for example a power and/or data communication cable or cable arrangement configured for enabling two-way data communication between the control unit 14 and the interface unit 15.

The interface bus 17 may also include electrical power supply for powering the interface unit 15. Thereby, the total amount of wires or cables can be reduced, or at least made more compact and easily installed.

Furthermore, each of the plurality of HRMs 12 is individually operably connected to the interface unit 15 via individual electrical wires 16, wherein the plurality of the individual electrical wires 16 form an electrical HRM harness 18.

Each HRM may be connected to the interface unit 15 via individual electrical wires. However, the electrical wires of a plurality of different HRMs may be combined in a multi-pin or multi-channel connector for the purpose of reducing the amount of electrical output connectors 19 on the interface unit 15.

For example, in case each HRM is powered by two wires, i.e. a positive and negative electrical wire, and that one of the electrical output connectors 19 of the interface unit 15 has for example 32 pins or channels, then 16 HRMs could be connected to the interface unit 15 via the same single 32-pin electrical output connector 19. This would require that the 32 individual electrical wires of 16 HRMs would be combined into a single electrical output connector, wherein each of said HRMs would still be individually actuatable by activation of the relevant pins of the 32-pin electrical output connector 19.

FIG. 5B shows an example embodiment in which two individual HRMs are connected to individual electrical output connectors 19 on the interface unit 15.

FIG. 5B also shows two other individual HRMs that have joined electrical wires to provide a single connector that is connected to a single electrical output connectors 19 on the interface unit 15. These two HRMs are nevertheless individually actuatable based on instructions from the control unit 14.

FIG. 5B also shows four other individual HRMs that have joined electrical wires to provide a single connector that is connected to a single electrical output connectors 19 on the interface unit 15. These four individual HRMs are nevertheless individually actuatable based on instructions from the control unit 14.

In other words, the interface unit 15 has a plurality of output connectors 19, wherein each of the plurality of HRMs 12 is directly connected to an output connector 19 of the interface unit 15 via individual electrical wires 16.

Moreover, the electrical wires 16 of a plurality of HRMs may be mounted within a common connector, while the electrical wires from different HRMs are isolated from each other, i.e. not in electrical contact with each other, for enabling connection of a plurality of HRMs to a single electrical output connectors 19 on the interface unit 15.

In particular, the electrical wires 16 connecting each HRM 12 to the interface unit 15 may be embedded in a multi-wire actuation cable 16, which form part of an electrical HRM harness.

In some example embodiments, each of the plurality of HRMs is configured to releasably hold a payload to a dispenser of the launch vehicle.

The electrical wires 16 connecting each HRM to the interface unit are configured for electrically actuating the HRM. The individual HRM electrical wires 16 is generally not a data bus cable or the like that submits data communication via a bus operating standard, but rather conventional wires configured for supplying electrical power for operating the HRMs 12, such as for example 3-30 Volt and 2-10 Ampere, depending on the type and size of HRM 12.

Resistance measurement via the individual HRM electrical wires 16 may be performed by the interface unit 15 for detecting whether the HRMs 12 are properly connected.

The interface unit 15 is configured for controlling actuation of the plurality of HRMs based on release operation instructions received from the control unit 14.

The control unit 14 submits instructions or commands to the interface unit 15 for actuation of individual and/or group HRMs 12, or for actuation of individual payloads. For example, the control unit 14 may submit instructions for release of individual payloads 3, or for release of a plurality of payloads 3 in a specific release order, or the like.

This may be accomplished by providing the interface unit 15 with a plurality of output channels, wherein each output channel is associated with an individual identifier, wherein the release operation instructions submitted from the control unit to the interface unit include identifier information indicating which output channel of the interface unit should be activated.

This requires that the HRMs are connected to the correct output channel of the interface unit 15. For example, if HRM #5 should be connected to output channel #10 according to a predetermined coupling plan, and the control unit wants to actuate the payload (PL1) that according to a plan is held by HRM #5 alone, the control unit would submit instructions to the interface unit to actuate output channel #10.

Alternatively, the control unit could submit instructions to the interface unit to actuate HRM #5 or even payload PL1, and the interface unit 15 would determine that these instructions correspond to actuation of output channel #10.

In other words, the release operation instructions submitted from the control unit to the interface unit can alternatively include information indicating a HRM identifier, or a payload identifier.

As a result, each of the plurality of HRMs is individually actuatable by the control unit via the interface unit.

In other words, according to some example embodiments, the interface unit has a plurality of output channels, and each output channel is associated with an individual identifier, and the release operation instructions submitted from the control unit to the interface unit include identifier information indicating which output channel of the interface unit should be activated.

According to some other example embodiments, the release operation instructions submitted from the control unit to the interface unit include information indicating a HRM identifier, or a payload identifier.

According to still some other example embodiments, each of the plurality of HRMs is individually actuatable by the control unit via the interface unit.

Alternatively, or in combination with the previous passage, the release operation instructions submitted from the control unit to the interface unit include instructions defining the identifier and actuation sequence of a plurality of HRMs.

In some example embodiments, when one or more sensors are connected to the interface unit 15, the control unit 14 may submits instructions to the interface unit 15 for performing a measurement and/or for obtaining measurement results from the interface unit 15.

The control unit 14 itself may receive instructions for payload release from a launch vehicle control unit, or directly from an earth control centre. Alternatively, the control unit 14 may autonomously determine a suitable release position of the payload 3 based on sensor input and/or dead reckoning navigation.

The control unit 14 is an electronic control unit having an electronic data processor, data memory, electrical connectors, communication interface, etc.

The control unit 14 and the interface unit 15 may communicate via data bus communication channel implemented by means of the interface bus.

Specifically, in some example embodiments of the disclosure, the control unit 14 has a first connector 20 that is connected to an input connector 21 of the interface unit 15 via the interface bus 17.

For ensuring two-way communication between the control unit 14 and the interface unit 15, both the first connector 20 of the control unit 14 and the input connector 21 of the interface unit have two-way communication capacity.

This may be for example be used when the control unit 14 want to have status report of the HRMs after having submitted release instructions to the interface unit 15. Specifically, the control unit 14 may then submit a status request to the interface unit 15 with respect to a certain HRM or a certain payload, and the interface unit 15 may in response thereto perform a resistance measurement of the relevant HRM for determining status of the HRM, such as actuated or non-actuated. The interface unit 15 would then send the status information back to the control unit 14 via the interface bus 17.

The interface unit 15 includes certain level of electronic equipment, for example for data communication with the control unit 14, an identifier or address register for all HRMs, and possibly also stored information establishing payload identifiers for all payloads of the payload dispenser structure 1, as well as identifiers or addresses of the HRMs that are collectively holding each individual payload.

Figure 6:
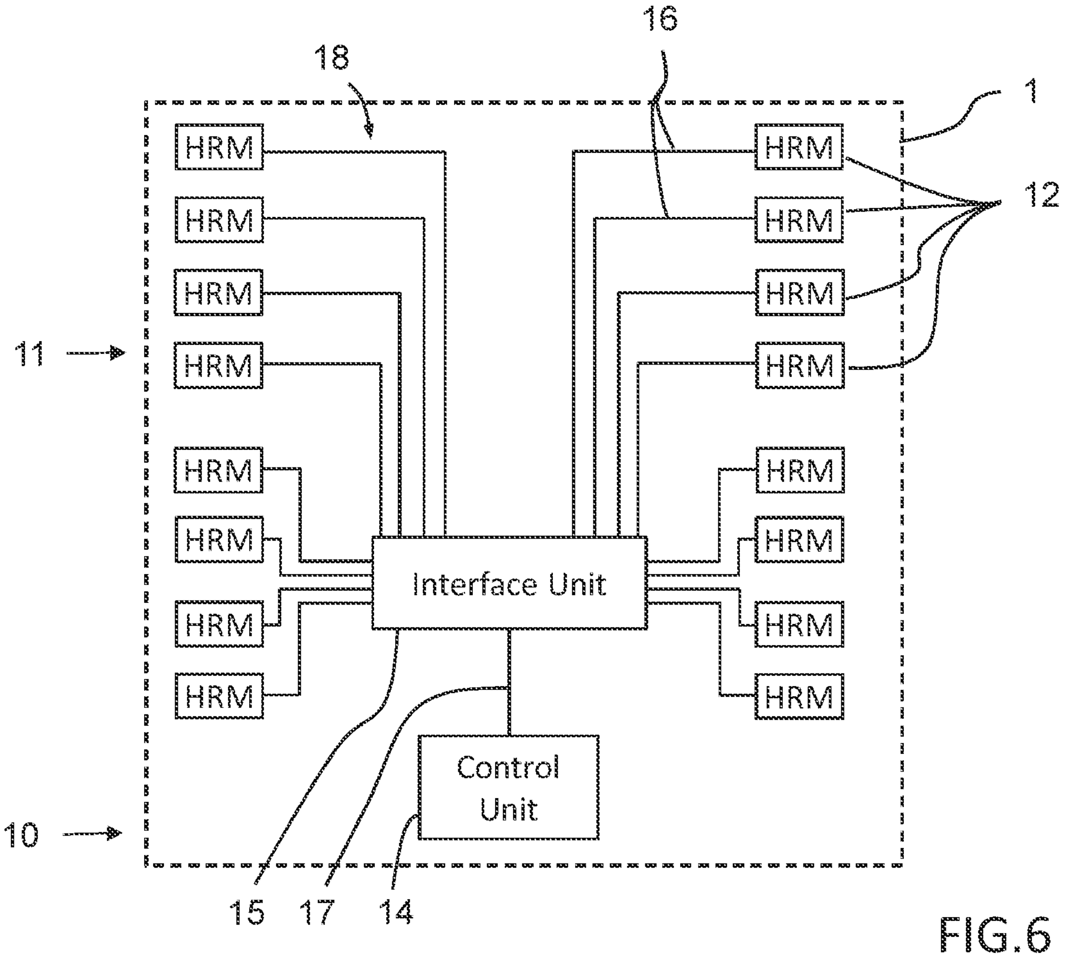
FIG. 6-8 show schematically different example embodiments of the multichannel actuation system according to the present disclosure.

FIG. 6 shows schematically a first embodiment of the electrical control structure of the HRMs 12. FIG. 6 shows that the control unit 14, the interface unit 15 and all HRMs 12 are located on the payload dispenser structure 1, and that all HRMs 12 of the payload dispenser structure 1 are connected to the same interface unit 15. FIG. 6 also schematically indicates that the payload dispenser structure 1 has an adapter portion 10 and a payload carrying portion 11.

With reference to FIGS. 1-6, the present disclosure relates to a multichannel actuation system for a launch vehicle, wherein the a multichannel actuation system comprises: a control unit 14 operably connected to a single interface unit 15; a plurality of individual hold-and-release mechanisms (HRMs) 12 configured for releasably holding a plurality of payloads 3 to the launch vehicle 2; wherein each of the plurality of HRMs 12 is operably connected to the interface unit 15; and wherein the interface unit 15 is configured for controlling actuation of the plurality of HRMs 12 based on release operation instructions received from the control unit 14.

Others said, the control unit 14 is connected with a single interface unit 15 through an interface bus 17 for enabling communication between the control unit 14 and interface unit 15, wherein the interface unit 15 is in communication with and provides the selective operation of all the HRMs 12 in the system.

In some example embodiments, each of the control unit 14 and the interface unit 15 are implemented in individual casings located mutually spaced apart.

In some example embodiments, the disclosure relates to a payload dispenser structure 1 for carrying and releasing a plurality of payloads 3, wherein the payload dispenser structure 1 comprises: a control unit 14 fastened to the payload dispenser structure 1; an interface unit 15 fastened to the payload dispenser structure 1 and being operably connected to the control unit 14 for receiving release operation instructions from the control unit 14; and a plurality of individual hold-and-release mechanisms (HRMs) 12 fastened to the payload dispenser structure 1 and configured for releasably holding a plurality of payloads 3 to the payload dispenser structure 1, wherein each HRM 12 of the payload dispenser structure 1 is operably connected to the interface unit 15.

Having each HRM 12 of the payload dispenser structure 1 being operably connected, via an individual HRM electrical wires 16, to the same interface unit 15, may result in relatively large HRM cable harness 18, especially when there are many HRMs 12 distributed over a large the payload dispenser structure 1. However, this design enables reduced overall complexity of the multichannel HRM actuation system, because there is reduced level of complex electronic circuits required at the HRMs, there is no need for a data bus system and the disadvantages associated therewith in terms of complexity and software issues that are generally more prone to reliability issues.

Moreover, by keeping the main part of the required electronics in two well defined control units, electronic circuit issues such as EMI, capacitive and/or inductive couplings, current leakage, ground noise, etc. can be better controlled and handled, thereby enabling improved operational reliability.

To conclude, the potentially increased weight and size of the HRM cable harness 18 associated with the design solution according to the present disclosure is compensated by other gains, such as potentially reduced complexity, reduced cost and increased operational reliability.

Figure 7:
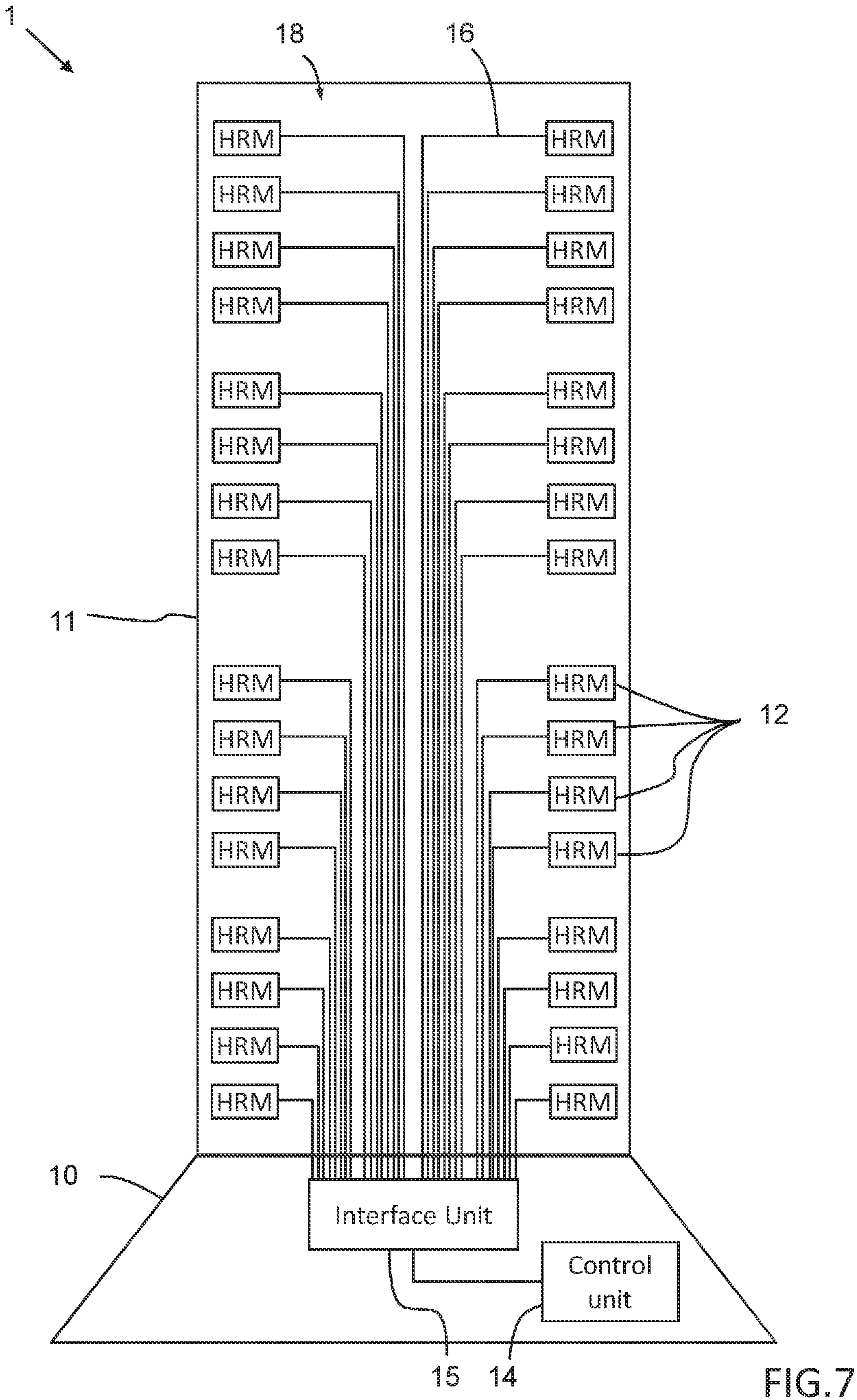

FIG. 7 schematically illustrates a payload dispenser structure having a more clearly distinguished adapter portion 10 and a more clearly distinguished payload carrying portion 11. The payload carrying portion 11 is configured to carry a plurality of payloads and the adapter portion 10 is configured to be connected to the launch vehicle or an engine. The control unit 14, the interface unit 15 and the plurality of HRMs 12 are fastened to the payload dispenser structure, and each HRM 12 of the payload dispenser structure 1 is operably connected to the interface unit 15.

In some example embodiments, the payload carrying portion 11 is a rigid support structure configured for carrying a plurality of payloads. For example, the payload carrying portion 11 is a rigid framework or tube made or metal, carbon fibre, or a composite material, for providing a strong, rigid and lightweight structure.

The adapter portion 10 can have virtually any shape and used for enabling a strong and rigid connection between the payload dispenser structure 1 and the underlying launch vehicle, or an engine. The adapter portion 10 carrying portion is for example composed of a rigid framework, a ring, a tube or a cone made of metal, carbon fibre, or a composite material, for providing a strong, rigid and lightweight structure.

The adapter portion and a payload carrying portion may be parts of the same single piece payload dispenser structure 1, i.e., a payload dispenser structure 1 made in one piece.

Alternatively, the adapter portion and a payload carrying portion may be separate parts that are mutually joined after manufacturing of each part. The joining may for example be performed by means of welding, clamping, gluing, threaded or riveting fastener, or the like.

In the example embodiment illustrated in FIG. 7, the payloads are attached to the payload dispenser structure 1 in a distributed configuration. This means that each payload 3 is attached directly to the payload dispenser structure 1, i.e. to an individual surface area of the payload dispenser structure 1. As described later in the text, the payloads can alternatively be attached to the payload dispenser structure 1 in a stacked configuration, meaning that some of the payloads are attached indirectly to the payload dispenser structure 1, namely via another payload.

In the example embodiment of FIG. 7, both the control unit 14 and the interface unit 15 are located in the adapter portion 10 of the payload dispenser structure 1, and the plurality of HRMs are located primarily or solely in the payload carrying portion 11 of the payload dispenser structure 1.

By installing both the control unit 14 and the interface unit 15 in the adapter portion 10 of the payload dispenser structure 1, they are less exposed to mechanical stress caused by vibrations and accelerations. The payload dispenser structure 1 is mounted to the launch vehicle at the adapter portion 10, which therefore is more stable than the payload carrying portion 11, which extends vertically like a free swinging beam fixed at one end only, namely at the adapter portion 10. Consequently, positioning of the control unit 14 and/or the interface unit 15 in the payload carrying portion 11 would result in increased mechanical stress on these units, as well as the associated electrical connectors, etc.

Nevertheless, there might be implementations in which the advantage of locating for example the interface unit 15 in the payload carrying portion 11 exceeds the disadvantage of increased stress and strain and vibration load. For example, with reference to FIG. 8, positioning of the interface unit 15 in the payload carrying portion 11 may result in reduced size and weight of the HRM electric cable harness 18, simply because the accumulated length between each HRM to the interface unit 15 can be reduced by locating the interface unit 15 closer to the HRMs.

Consequently, in some example embodiments, the control unit is located in the adapter portion 10 of the payload dispenser structure, and the interface unit together with the HRMs are located in the payload carrying portion 11 of the payload dispenser structure 1.

In some example embodiments, the interface unit 15 is located in a centre region of the plurality of HRMs, as seen in an intended flight direction 9 of the payload dispenser structure 1. This tends to result in a relatively low size of the HRM electric cable harness 18.

According to a further example embodiment, the interface unit 15 is attached to the payload dispenser structure at a location that results in substantially minimal weight of the total amount of HRM electrical wires 16.

The term substantially should be construed to mean a value near the minimum weight, but not necessarily the absolute minimum weight of the total amount of HRM electrical wires 16. Furthermore, it must be based on customary routing of the electrical wires extending between the interface unit and each HRM. Customary routing of electrical wires means well-supported and well-fastened wires on the payload dispenser structure and not free-hanging or loose wires, and the like.

Figure 9A:
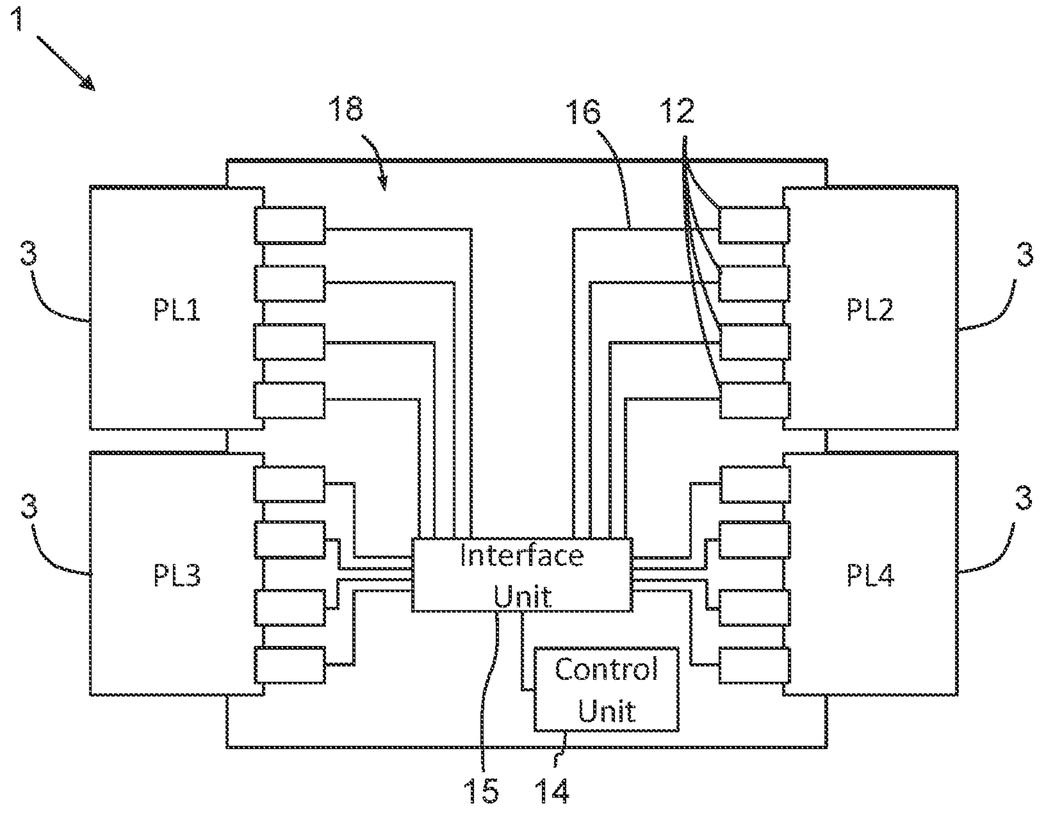
FIG. 9A-B show schematically an example embodiment of the multichannel actuation system according to the present disclosure in a non-released state and a partly released state, respectively.
Figure 9B:
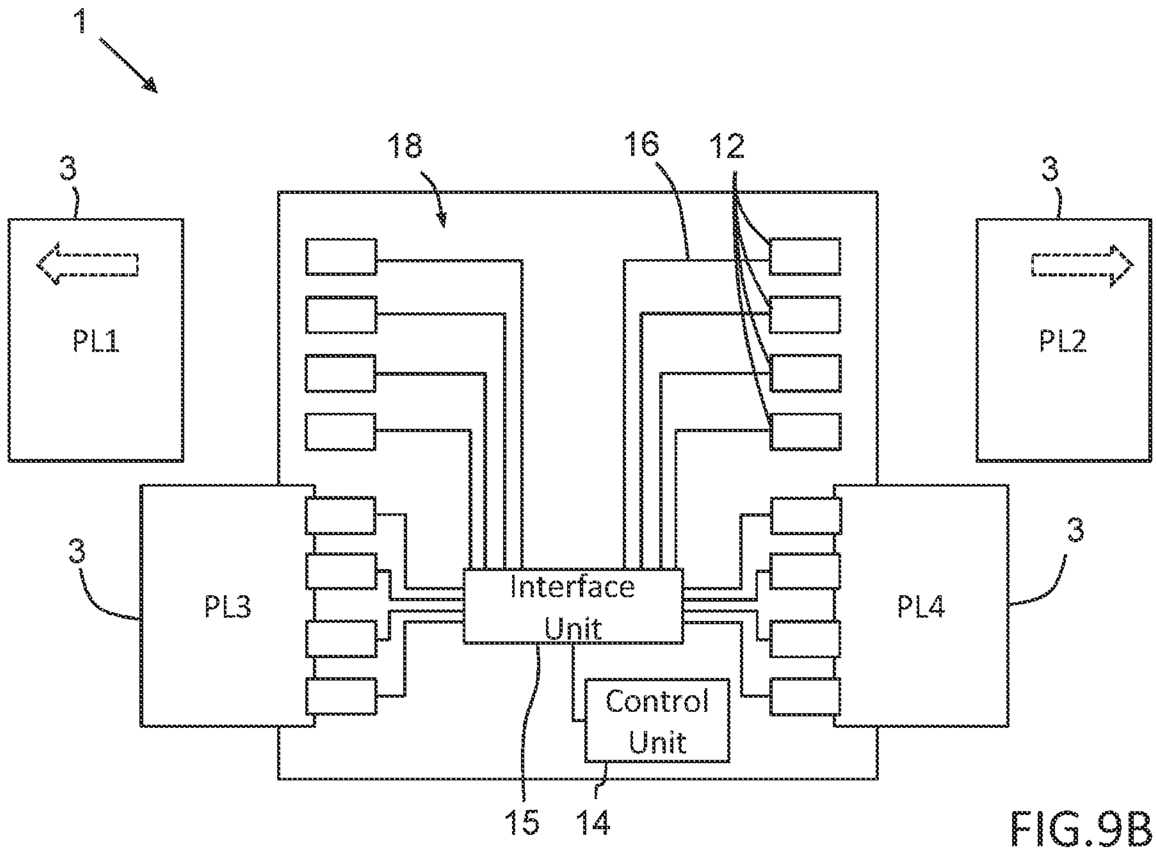

FIGS. 9A-9B shows the same electrical control structure of the HRMs 12 as described with reference to FIG. 6, but here with four payloads PL1-4 are attached to the HRMs 12 in FIG. 9A, and FIG. 9B shows the same arrangement after release of two payloads PL1, PL2. This illustrates the release functionality of this example embodiment of the payload dispenser structure 1.

FIGS. 9A-9B also show that a first subset of the plurality of individual HRMs 12 are arranged to jointly hold a first payload PL1 to the payload dispenser structure 1, and wherein a second subset of the plurality of individual HRMs 12 are arranged to jointly hold a second payload PL2 to the payload dispenser structure 1.

In some example embodiments, payloads 3 may be releasably fastened to the payload dispenser structure 1 via a single, two, four, any amount of individual HRMs.

Figure 10B:
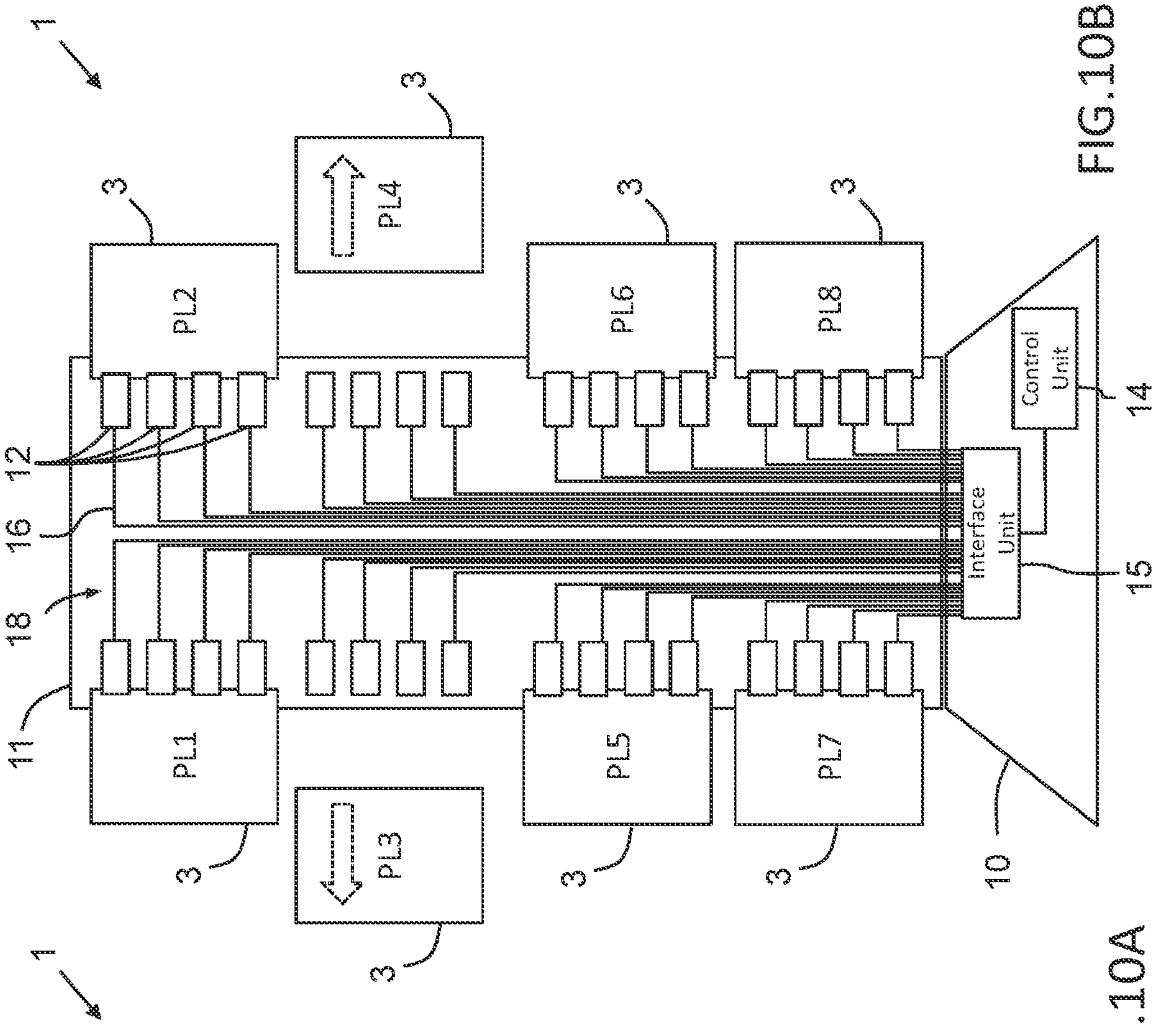
FIG. 10A-B show schematically a further example embodiment of the multichannel actuation system according to the present disclosure in a non-released state and a partly released state, respectively.
Figure 10A:
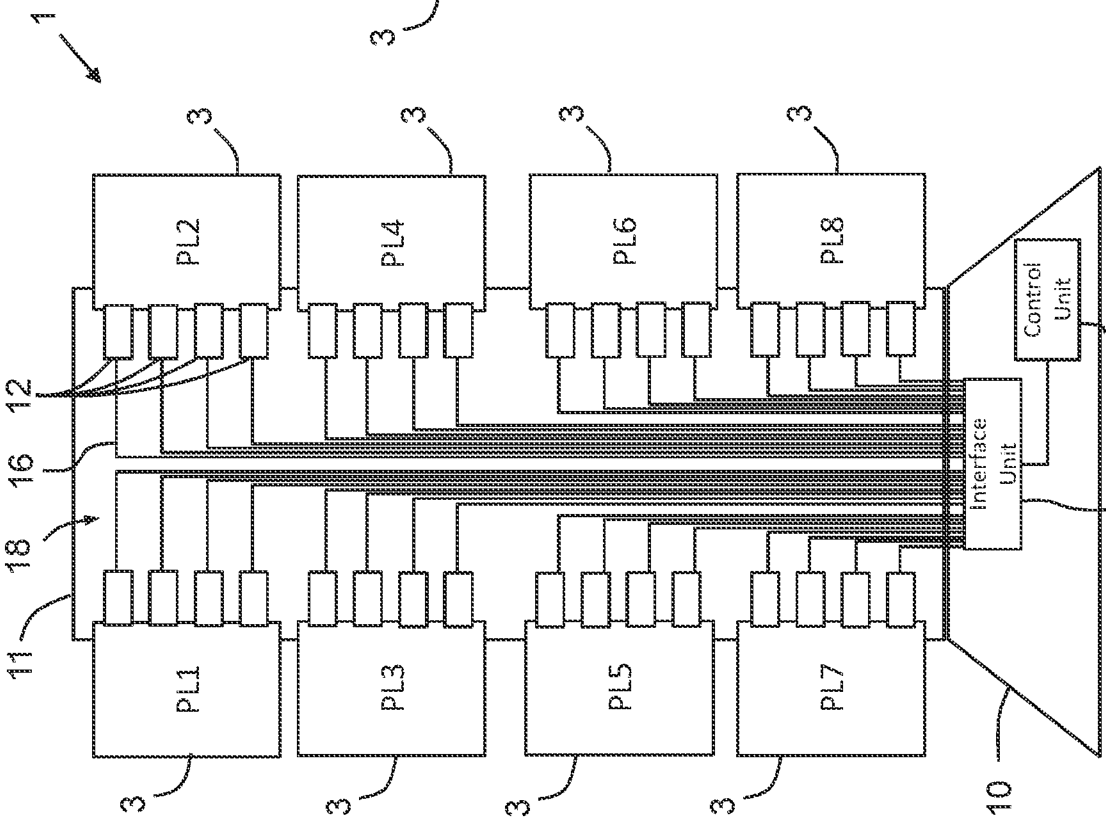

FIGS. 10A-10B shows the same electrical control structure of the HRMs 12 as described with reference to FIG. 7, but here with eight payloads PL1-8 attached to the HRMs 12 in FIG. 10A, and FIG. 10B shows the same arrangement after release of two payloads PL3, PL4. This illustrates the release functionality of this example embodiment of the payload dispenser structure 1.

Figure 8:
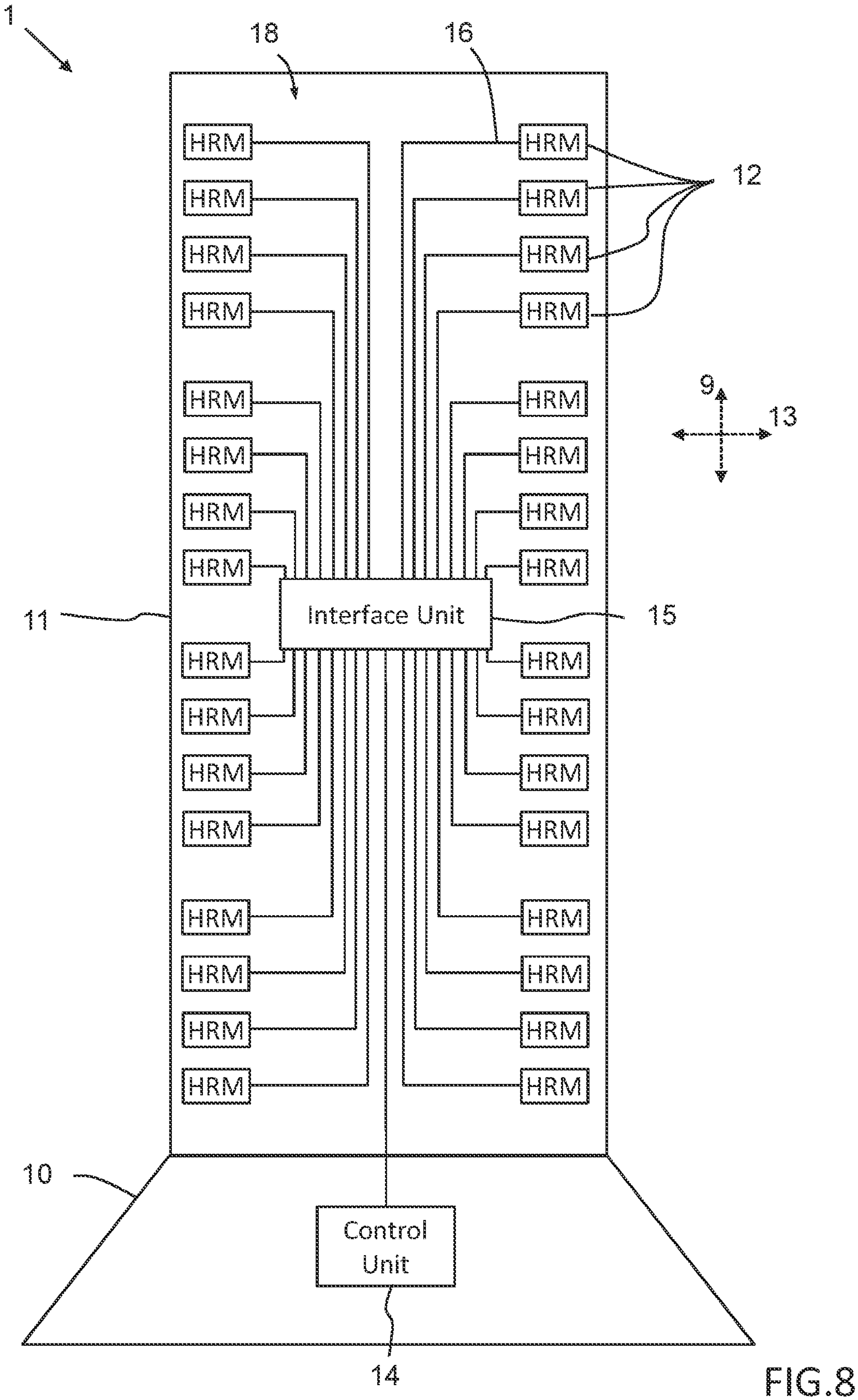
Figure 11B:
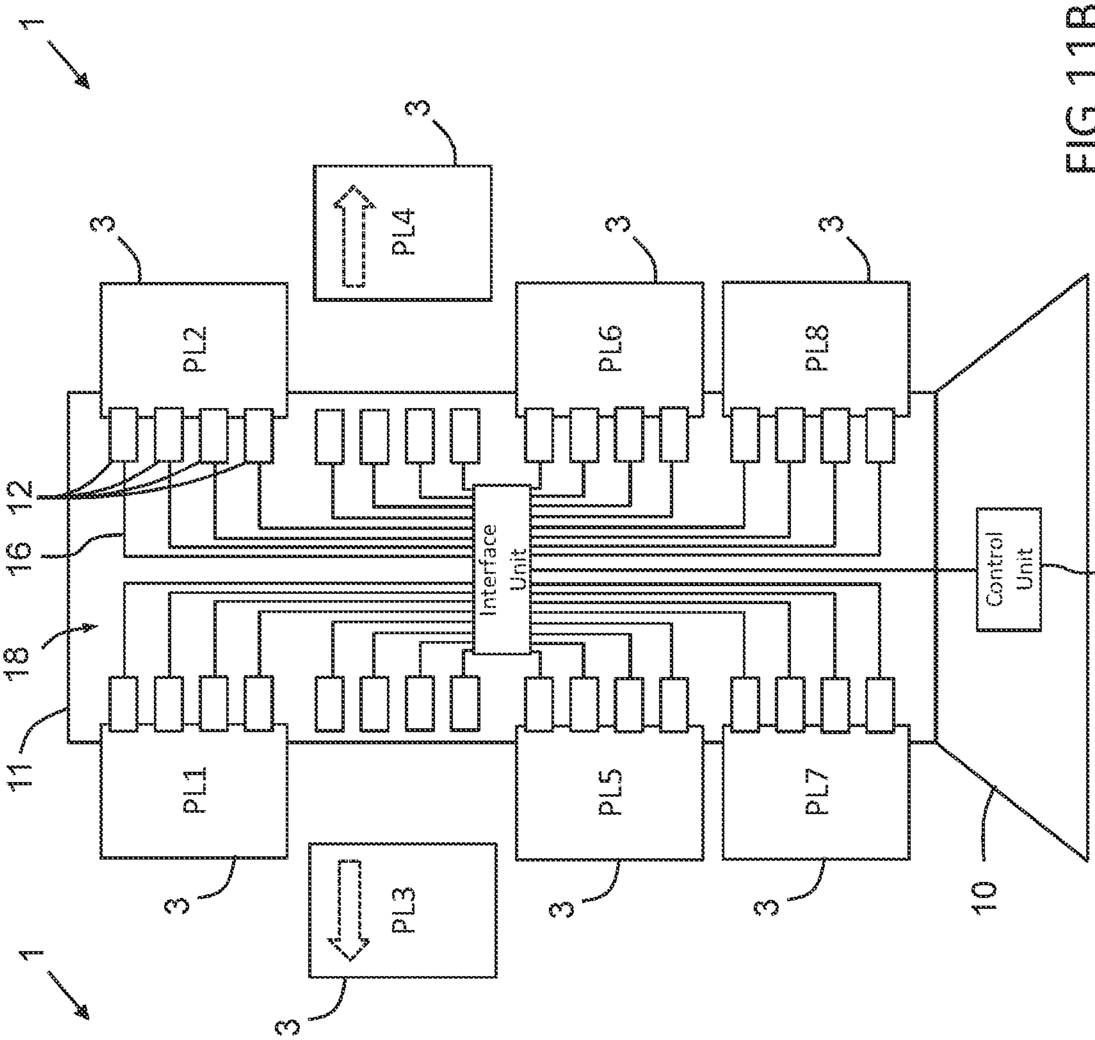
FIG. 11A-B show schematically still a further example embodiment of the multichannel actuation system according to the present disclosure in a non-released state and a partly released state, respectively.
Figure 11A:
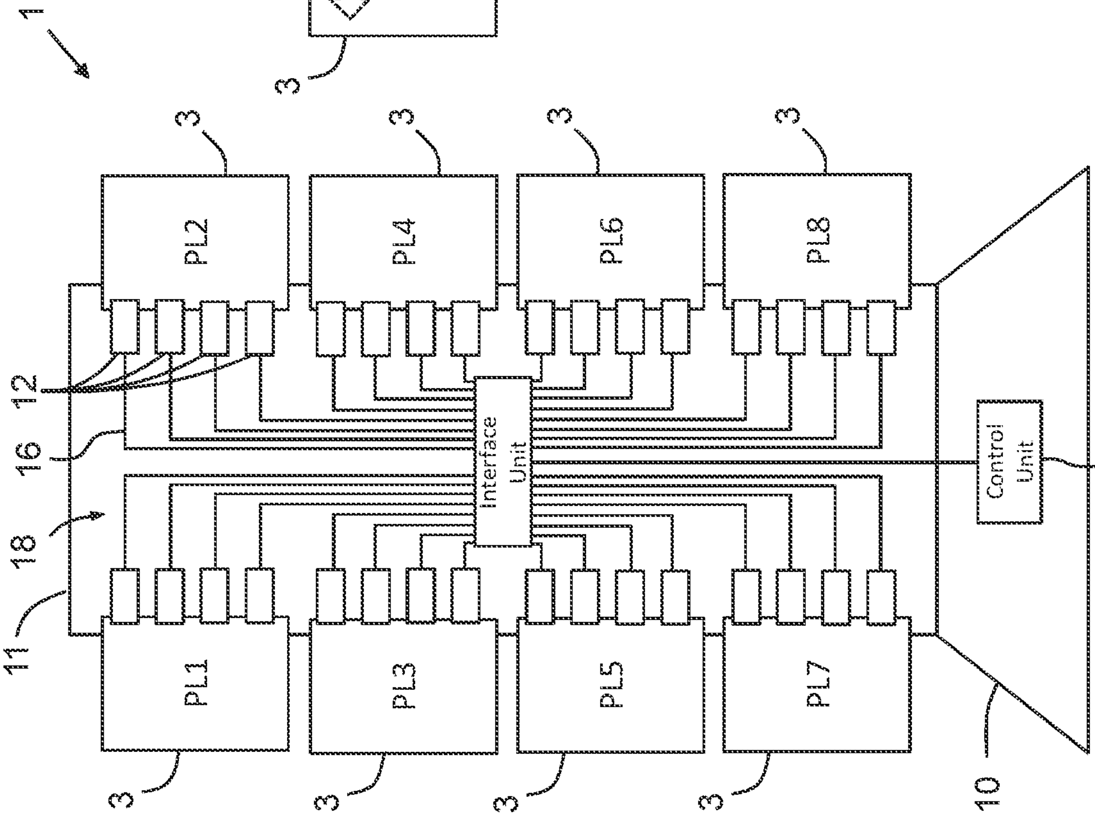

FIG. 11A-11B shows the same electrical control structure of the HRMs 12 as described with reference to FIG. 8, but here with eight payloads PL1-8 attached to the HRMs 12 in FIG. 11A, and FIG. 11B shows the same arrangement after release of two payloads PL3, PL4. This illustrates the release functionality of this example embodiment of the payload dispenser structure 1.

Figure 12B:
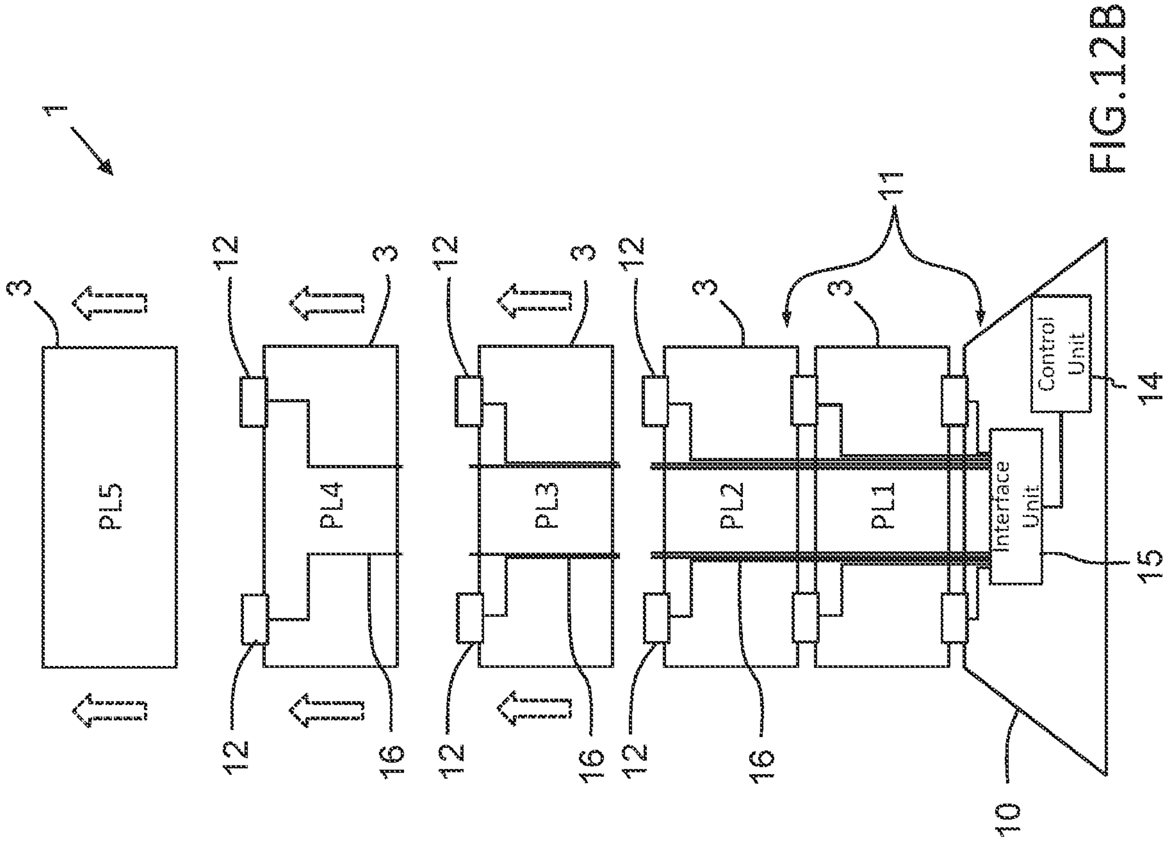
FIG. 12A-B show schematically yet another example embodiment of the multichannel actuation system according to the present disclosure in a non-released state and a partly released state, respectively.
Figure 12A:
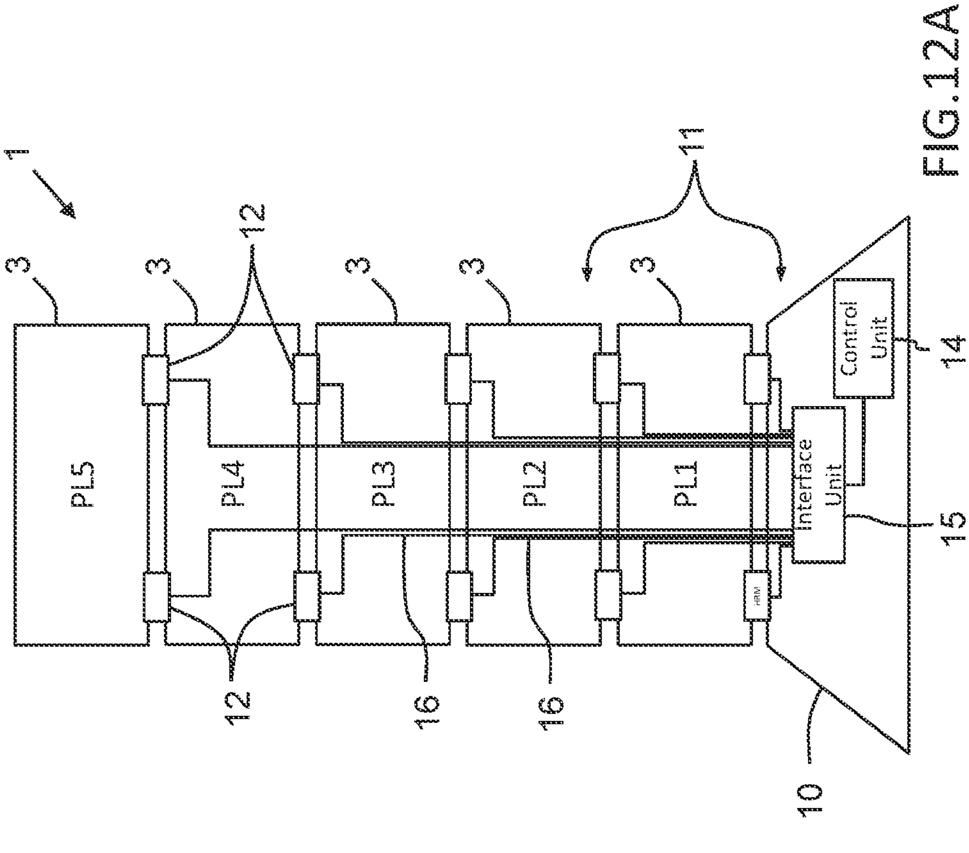

With reference to FIGS. 12A-12B, the payload dispenser structure 1 may be configured to carry a plurality of payloads in a stacked configuration. In FIG. 12A, this means that only a first the payload PL1 located closest to the payload dispenser structure 1 is actually directly fastened to the payload dispenser structure 1 via a set of HRMs 12. The second payload PL2 is releasably fastened to the first payload PL1 via another set of HRMs 12, and the third payload PL3 is releasably fastened to the second payload PL2 via yet another set of HRMs 12, and so on.

In this example embodiment, the payload carrying portion 11 of the payload dispenser structure 1 may either be deemed to be located on a top side of the adapter or a portion of the stacked payloads 3 themselves.

The electrical wires 16 that connect the HRMs to the interface unit 15 are here equipped with intermediate umbilical connectors that enables separation of the wires or cables 16 in connection with separation of the payloads 3.

Figure 13:
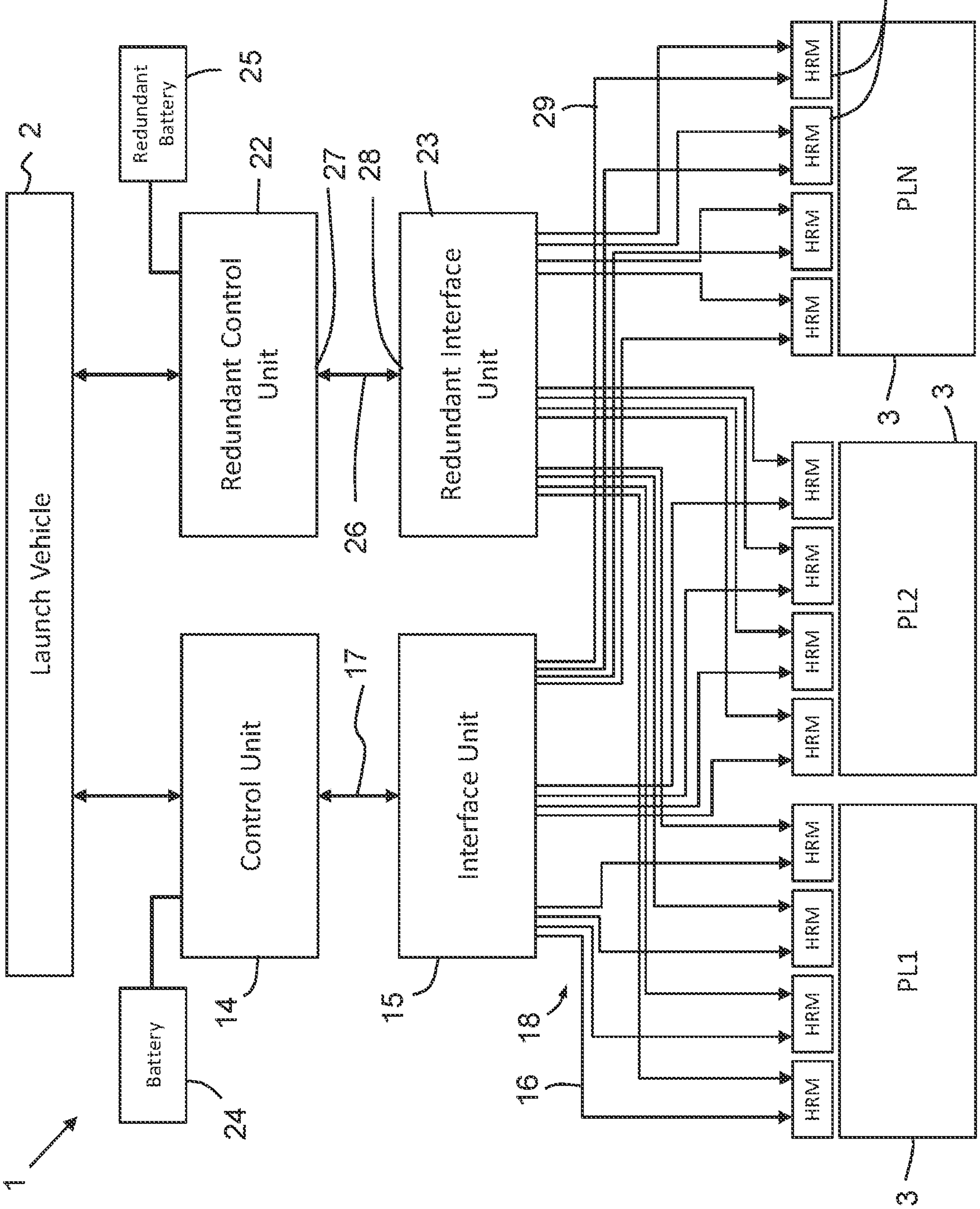
FIG. 13 shows schematically an example embodiment of a redundant multichannel actuation system according to the present disclosure.

FIG. 13 shows a redundant version of the multichannel actuation system according to the disclosure. In this example embodiment, the multichannel actuation system not only comprises the features described above with reference to FIGS. 6 and 9A, but in additional also a redundant control unit 22 operably connected to and in communication with a single redundant interface unit 23, wherein each of the plurality of HRMs 12 is connected also to the redundant interface unit 23, and the redundant interface unit 23 is configured for controlling actuation of the HRMs 12 based on release operation instructions received from the redundant control unit 22.

Specifically, in the example embodiment of FIG. 13, the redundant control unit 22 has a first connector 27 that is connected to an input connector 28 of the redundant interface unit 23 via a redundant interface bus 26.

Moreover, the redundant interface unit 23 has a plurality of output connectors, wherein each of the plurality of HRMs 12 is directly connected to an output connector of the redundant interface unit 23 via individual redundant electrical wires 29.

FIG. 13 also shows that the control unit 14 is connected to a power supply, here in form of a battery 24, for operating the control unit. Moreover, the interface bus also includes a power supply capacity, such that also the interface unit 15 is powered by the battery 24 via the interface bus 17. This provides a cost-efficient and compact design.

Similarly, for improved redundancy, the redundant control unit 22 is connected to a separate power supply, here in form of a redundant battery 25, for operating the redundant control unit 22. Moreover, the redundant interface bus 26 also includes a power supply capacity, such that also the redundant interface unit 23 is powered by the redundant battery 25 via the redundant interface bus 26. This provides a cost-efficient and compact design.

FIG. 13 additionally shows an example embodiment of how the multichannel actuation system can interact with the launch vehicle 2. For example, the launch vehicle 2 may provide the control unit 14 and the redundant control unit 22 with payload release instructions and/or telemetry data.

For all the example embodiments described herein, the plurality of HRMs 12 may be designed as a non-energetic type, or an energetic type, or a mixture of non-energetic and energetic types. An energetic type of HRM refers to a pyrotechnical operated HRM, and a non-energetic type refers to a non-pyrotechnical operated HRM.

Figure 14:
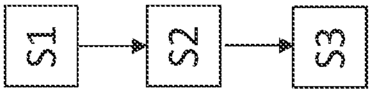
FIG. 14 shows schematically the basic steps of a method for operating a multichannel actuation system according to the present disclosure.

The present disclosure also relates to a method for operating the multichannel actuation system for a payload dispenser structure of a launch vehicle, as described with reference to FIG. 14, wherein the multichannel actuation system comprises a control unit operably connected to a single interface unit, and a plurality of individual hold-and-release mechanisms (HRMs) configured for releasably holding a plurality of payloads to the launch vehicle, wherein each of the plurality of HRMs is operably connected to the interface unit.

The method comprises the following basic steps: a first step S1 of obtaining instructions by the control unit about release operation of one or more payloads; a second step S2 of submitting release operation instructions from the control unit to the interface unit; and a third step S3 of controlling actuation of a plurality of individual HRMs for releasing one or more of the plurality of payloads from the payload dispenser structure.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1. Payload dispenser structure
2. Launch vehicle
3. Payload
4. Main engine
5. Fuel tank portion 6. Top portion
7. Payload fairing
8. Payload dispenser structure
9. Flight direction
10. Adapter portion
11. Payload carrying portion
12. Hold-and-release mechanism (HRM)
13. Lateral direction
14. Control unit
15. Interface unit
16. HRM electrical wires
17. Interface bus
18. HRM harness
19. Electrical output connector of interface unit
20. First connector of control unit
21. Input connector of interface unit
22. Redundant control unit
23. Redundant interface unit
24. Battery
25. Redundant battery
26. Redundant interface bus
27. First connector of redundant control unit
28. Input connector of redundant interface unit
29. Individual redundant HRM electrical wires

The invention claimed is:

1. A payload dispenser structure for carrying and releasing a plurality of payloads, comprising:
a control unit fastened to the payload dispenser structure;
an interface unit fastened to the payload dispenser structure and being operably connected to the control unit via a data communication cable for receiving release operation instructions from the control unit; and
a plurality of individual hold-and-release mechanisms (HRMs) fastened to the payload dispenser structure and configured for releasably holding a plurality of payloads to the payload dispenser structure, wherein each HRM of the payload dispenser structure is operably connected to the same interface unit,
wherein each of the control unit and the interface unit is implemented in an individual casing,
wherein the interface unit is directly electrically connected to each HRM via individual electrical actuation wires,
wherein the individual electrical actuation wires of different HRMs are isolated from each other, and
wherein the interface unit is configured to perform a resistance measurement through the individual electrical actuation wires connected to that HRM.

2. A method for operating a multichannel actuation system for a payload dispenser structure of a launch vehicle, wherein the multichannel actuation system comprises a control unit operably connected to a interface unit via a data communication cable, and a plurality of individual hold-and-release mechanisms (HRMs) configured for releasably holding a plurality of payloads to the launch vehicle, wherein each of the plurality of HRMs is operably connected to the same interface unit, wherein each of the control unit and the interface unit is implemented in an individual casing, wherein the interface unit is directly electrically connected to each HRM via individual electrical actuation wires, wherein the individual electrical actuation wires of different HRMs are isolated from each other, and wherein the interface unit is configured to perform a resistance measurement through the individual electrical actuation wires connected to that HRM; the method comprising:
obtaining instructions by the control unit about release operation of one or more payloads;
submitting release operation instructions from the control unit the interface unit;
controlling actuation of a plurality of individual HRMs for releasing one or more of the plurality of payloads from the payload dispenser structure by supplying electrical actuation power from the interface unit to selected HRMs via the respective individual electrical actuation wires.

3. A multichannel actuation system for a launch vehicle comprising:
a control unit operably connected to an interface unit via a data communication cable, wherein each of the control unit and the interface unit is implemented in an individual casing; and
a plurality of individual hold-and-release mechanisms (HRMs) configured for releasably holding a plurality of payloads to the launch vehicle;
wherein each of the plurality of HRMs is operably connected to the same interface unit;
wherein the interface unit is configured for controlling actuation of the plurality of HRMs based on release operation instructions received from the control unit;
wherein the interface unit is directly electrically connected to each HRM via individual electrical actuation wires;
wherein the individual electrical actuation wires of different HRMs are isolated from each other; and
wherein the interface unit is configured to perform a resistance measurement through the individual electrical actuation wires connected to that HRM.

4. The multichannel actuation system according to claim 3, wherein the control unit has a first connector that is connected to an input connector of the interface unit via an interface bus.

5. The multichannel actuation system according to claim 3, wherein the interface unit has a plurality of output connectors, wherein each of the plurality of HRMs is directly connected to an output connector of the interface unit via individual electrical wires.

6. The multichannel actuation system according to claim 3, wherein a first subset of the plurality of individual HRMs are arranged to jointly hold a first payload to a dispenser of the launch vehicle, and wherein a second subset of the plurality of individual HRMs are arranged to jointly hold a second payload to the dispenser of the launch vehicle.

7. The multichannel actuation system according to claim 3, wherein each of the plurality of HRMs is configured to releasably hold a payload to a dispenser of the launch vehicle.

8. The multichannel actuation system according to claim 3,
wherein the interface unit has a plurality of output channels, wherein each output channel is associated with an individual identifier, and wherein the release operation instructions submitted from the control unit to the interface unit include identifier information indicating which output channel of the interface unit should be activated,
a HRM identifier, or a payload identifier.

9. The multichannel actuation system according to claim 3, wherein each of the plurality of HRMs is individually actuatable by the control unit via the interface unit.

10. The multichannel actuation system according to claim 3, wherein the plurality of HRMs are of a non-energetic type, or an energetic type, or a mixture of non-energetic and energetic types.

11. The multichannel actuation system according to claim 3, further comprising a redundant control unit operably connected to a redundant interface unit, and wherein each of the plurality of HRMs is connected also to the redundant interface unit, and wherein the redundant interface unit is configured for controlling actuation of the HRMs based on release operation instructions received from the redundant control unit.

12. The multichannel actuation system according to claim 11, wherein the redundant control unit has a first connector that is connected to an input connector of the redundant interface unit via a redundant interface bus.

13. The multichannel actuation system according to claim 11, wherein the redundant interface unit has a plurality of output connectors, wherein each of the plurality of HRMs is directly connected to an output connector of the redundant interface unit via individual redundant HRM electrical wires.

14. The multichannel actuation system according to claim 3, further comprising a payload dispenser structure having an adapter portion and a payload carrying portion, wherein the payload dispenser structure is configured to carry a plurality of payloads, wherein the control unit, the interface unit and the plurality of HRMs are fastened to the payload dispenser structure, and wherein each HRM of the payload dispenser structure is operably connected to the interface unit.

15. The multichannel actuation system according to claim 14, wherein the control unit is located in the adapter portion of the payload dispenser structure, and wherein the interface unit is located in the payload carrying portion of the payload dispenser structure.

16. The multichannel actuation system according to claim 14, wherein the interface unit is located in a centre region of the plurality of HRMs.

17. The multichannel actuation system according to claim 14, wherein both the control unit and the interface unit are located in the adapter portion of the payload dispenser structure, and wherein the plurality of HRMs are located in the payload carrying portion of the payload dispenser structure.

18. The multichannel actuation system according to claim 14, wherein the interface unit is attached to the payload dispenser structure at a location that reduces a total weight of HRM electrical wires that interconnect the HRMs with the interface unit.

19. A launch vehicle comprising the multichannel actuation system according to claim 3.

* * * * *